Aug. 24, 1937.    J. H. GRENZEBACK    2,090,674
CAN AND PAN LIFTER
Filed Aug. 31, 1935
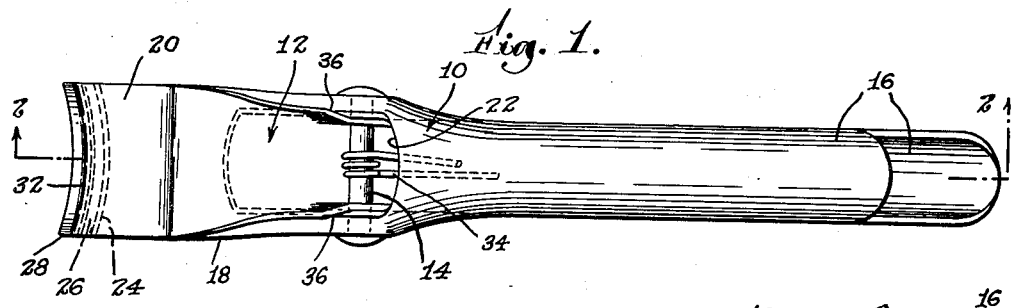
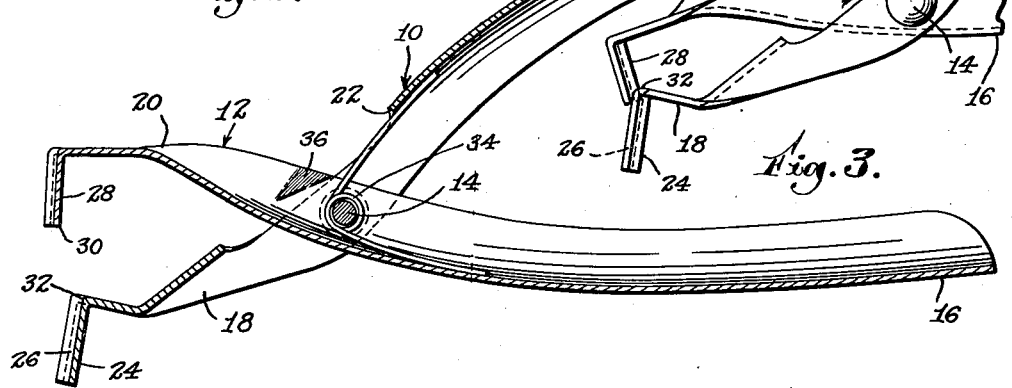
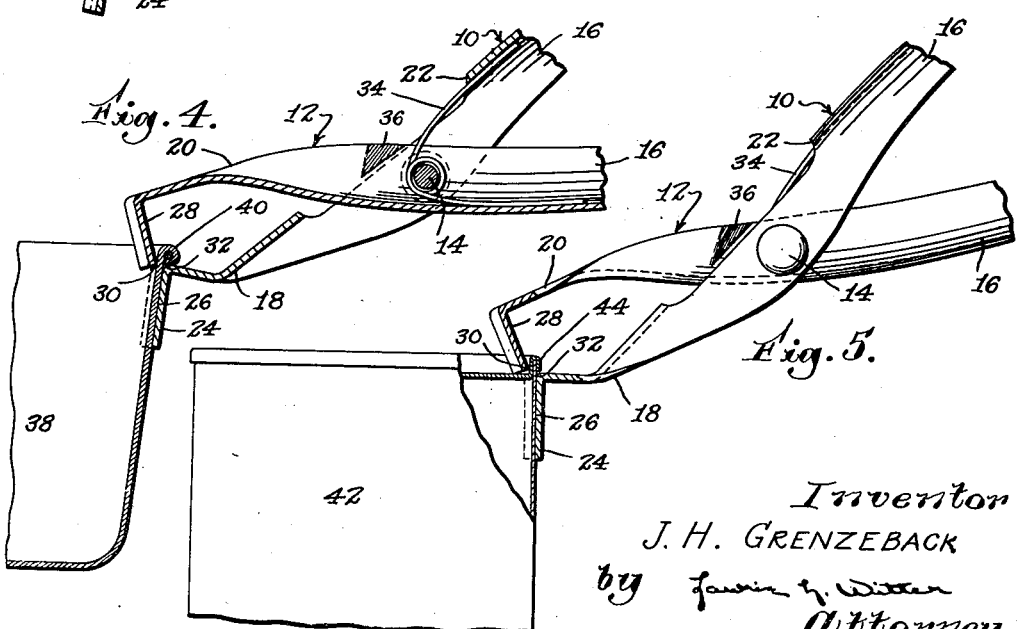
Inventor
J. H. GRENZEBACK
by
Attorney Patented Aug. 24, 1937

2,090,674

UNITED STATES PATENT OFFICE 2,090,674

CAN AND PAN LIFTER

James H. Grenzeback, West Hollywood, Calif.

Application August 31, 1935, Serial No. 38,730

1 Claim. (Cl. 294—31)

This invention relates to can and pan lifters and has for its primary object the production of an improved implement for lifting hot cans, pans, tins and the like. I am aware that pivoted tong-like devices provided with gripping jaws have heretofore been devised for engaging the edge wall of a pan and gripping the same with sufficient force to permit lifting of the pan. Such devices, however, have various objections, among which may be mentioned (1) the upper jaw projects a considerable distance into the pan and, therefore, into the contents thereof; (2) the security of the grip on the pan and, therefore, the lifting force thereof, is dependent upon the manual gripping force exerted on the devices; (3) the devices can be used with open containers only. It is an object of my invention to produce a new and improved device of this general nature wherein all such objections are eliminated.

My improved lifter embodies a pair of tong-like members pivoted together and on one of which is a supporting jaw of substantial area for engaging the exterior side wall of the pan or can to be lifted and for engaging against the top edge bead or rim thereof, and cooperating with the supporting jaw is a holding jaw on the other member for engaging the interior side wall of the pan adjacent to the top edge thereof. The function of the holding jaw is to keep the top edge of the pan engaged with the supporting jaw and, when the jaws are thus engaged with a container, this function is performed and the can or pan may be lifted without requiring any considerable manual pressure on the device. Furthermore, the engagement of the holding jaw adjacent to the top edge of the container not only provides for lifting open containers without dipping the holding jaw thereinto but also provides for the lifting of closed containers, such as hot unopened cans of beans, soup, etc., thus providing an implement very useful in camp and outdoor cooking, as well as in the kitchen.

These and other features of the invention will be best understood and appreciated from the following description of a preferred embodiment thereof, selected for purposes of illustration and shown in the accompanying drawing, in which Fig. 1 is a plan view of a can or pan lifter embodying my invention;

Fig. 2 is a sectional view taken on line 2—2 of Fig. 1 and showing the lifter in open position;

Fig. 3 is a fragmentary side elevation showing the lifter in closed position;

Fig. 4 is a fragmentary sectional view similar to Fig. 2 and showing the lifter engaged with a pan; and Fig. 5 is a side elevation, partially in section, showing the lifter engaged with a closed can.

Referring more specifically to the drawing by reference characters, 10 and 12 indicate a pair of tong-like members pivoted together at 14, each member having an elongated handle portion 16 at one side of the pivot and the two members respectively having gripping portions 18 and 20 at the other side of the pivot. The handle portions are preferably curved transversely and the member 10 has an opening 22 therethrough and through which extends the member 12, the pivot pin 14 extending through the side walls of the two members at this opening.

The gripping portion 18 has on its free end a part 24 projecting laterally therefrom and provided with a surface 26 of substantial area for engaging against the can or pan to be lifted. The gripping portion 20 has on its free end a part 28 projecting laterally therefrom toward the part 24 in a direction to engage its forward end 30 with the part 24 adjacent to its junction 32 with the gripping portion 18. When the device is to be used for cans, pans and the like having curved side walls, the parts 26 and 28 are curved, as best illustrated in Fig. 1. The members 10 and 12 are shown in fully closed position in Fig. 3 and in the normal open position in Fig. 2. A spring 34 anchored to the pivot pin 14 normally holds the jaws in the open position of Fig. 2. This position of the members is controlled by the tapering side wall portions 36 of the member 12, these walls binding against the side walls of the opening 22 and thereby acting as a stop to the opening movement. In such position the gripping jaws are open a sufficient distance to receive thereinto the edge portions of cans and pans of usual size to be lifted. If occasion arises for the use of a larger jaw spread, this may be secured merely by pulling the handle portions 16 further apart.

The use of the device in lifting a pan 38 is illustrated in Fig. 4. The supporting jaw part 24 is engaged against the exterior side wall of the pan with the shoulder 32 thereof closely adjacent to the bead or rim 40 of the pan. The handle portions 16 are then compressed to bring the end 30 of the part 28 into contact with the interior side wall of the pan adjacent to the top edge thereof. As thus gripped, the side wall of the pan is supported at 26 and the contact at 30 holds the side wall engaged against the shoulder 32. When the pan is thus lifted, its weight acts in one direction against the surface 26 and in the opposite direction outwardly against the part 28, this latter force being in a direction substantially longitudinally of the member 12 and, therefore, having little effect to cause opening movement of the members 10 and 12. It will, therefore, be seen that a secure gripping and lifting force on the pan does not require a considerable amount of pressure on the handle portions 16.

The use of the device in lifting a closed or unopened can 42, as illustrated in Fig. 5, is substantially the same as when lifting a pan. The part 24 is engaged against the side of the can with the shoulder 32 engaged against the bead 44. Closing of the members 10 and 12 brings the jaws to the position illustrated, whereupon the can is gripped securely and may be lifted without danger of dropping the same. It will be noted that even though the bead 44 is relatively thin, the contacts at 30 and 32 serve to hold the parts so engaged that they cannot become disengaged from the can so long as the jaws are held in closed position.

Having thus described my invention, what I claim as new and desire to secure by Letters Patent is:

A can and pan lifter comprising two sheet metal members pivoted together at intermediate points thereof, the two members having two cooperating handles at one side of the pivot and inner and outer cooperating jaws on the other side of the pivot, the inner jaw having its end portion bent downwardly to provide a shoulder at the bend and curved transversely to provide a forward concave face adapted to engage firmly against the outer wall of a container to be lifted, the outer jaw having its end portion bent downwardly in a direction causing its free end to contact with the first named portion adjacent to and forwardly of said bend when the jaws are closed into contact, whereby when engaged with a container the curved inner jaw contacts with the exterior wall of the container over a widely spaced area thereof and the outer jaw engages the interior wall of the container adjacent to said bend and holds the container in contact with the inner jaw, pressing said handles toward each other being adapted to grip said jaws together onto the container.

JAMES H. GRENZEBACK.